though trace amounts of catalyst may be inadvertently left in the polymer, such amounts are not sufficient to serve the purpose of the present invention.

United States Patent Office 3,492,078
Patented Jan. 27, 1970

3,492,078
PROCESS FOR DYEING POLYOLEFINS WITH METALLIZABLE AZOLE DYESTUFFS
Paul L. Stright, Erie County, N.Y., assignor to Allied Chemical Corporation, New York, N.Y., a corporation of New York
No Drawing. Continuation-in-part of applications Ser. No. 196,921, May 23, 1962, and Ser. No. 261,867, Feb. 28, 1963. This application July 7, 1965, Ser. No. 470,246
Int. Cl. D06p 1/10, 5/00
U.S. Cl. 8—42               17 Claims

ABSTRACT OF THE DISCLOSURE

A process for dyeing α-olefin polymers, particularly polypropylene, containing from 0.002 to 3.0% by weight of a Werner complex forming metal dispersed therein, by contacting them with an aqueous dispersion of a water-insoluble monoazo dyestuff of the formula

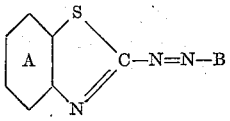

wherein A represents an ortho-arylene radical of the benzene series and B is the residue of an azo coupling agent having a hydroxyl group in a position ortho with respect to the azo linkage.

---

This application is a continuation-in-part of my copending applications Ser. No. 196,921, filed May 23, 1962 and Ser. No. 261,867, filed Feb. 28, 1963, both now abandoned.

This invention relates to a process for dyeing α-olefin polymers. More particularly, it relates to the dyeing of normally solid polymers of α-olefins having from two to three carbon atoms and containing a Werner complex forming metal. Especially, this invention is concerned with the dyeing of polypropylene containing a Werner complex forming metal or compound thereof with a water insoluble monoazo dyestuff of the benzothiazole series capable of forming a metal chelate with said metal.

Polymers of α-olefins such as ethylene and propylene have been produced in steadily increasing quantities and grades in recent years, and because of their many valuable characteristics of mechanical strength, high elasticity, resistance to solvents and other elements, have found their way into a multitude of useful applications in the form of films, filaments, yarns, fabrics, ropes, molded products, and the like. However, because of their extreme chemical inertness and hydrophobic character, these materials have shown little affinity for dyestuffs and pigments generally available for the coloration of natural and synthetic materials. Thus attempts to effect the coloration of α-olefin polymers by compounding pigments into the resin, as in Banbury mixers, compound extruders or the like, were not entirely satisfactory due to the difficulty in obtaining adequate dispersion of the pigment. Disperse dyestuffs produce light to medium shades in poly-α-olefins although the fastness to light and washing of such colorations leaves much to be desired.

The receptivity of the polymers for known classes of dyestuffs has been improved by grafting or otherwise introducing polymeric chains containing functional groups to the polyolefin. However, such measures while successful add to the cost of the resultant fiber.

It has recently been disclosed to dye polyolefin fibers by conventional dyeing procedures by means of oil-soluble dyes, emulsified in water and oil. Such emulsions when applied to poly-α-olefin textiles in aqueous dyebaths produce light to medium shades of acceptable fastness characteristics, but tend to leave a residue of the carrier oil on the goods, which is removed with difficulty, as by drastic soaping or costly extraction procedures.

It is a principal object of the present invention to provide an effective process for the coloration of normally solid polymers of α-olefins having from 2 to 3 carbon atoms.

Another object is to provide a process for dyeing poly-α-olefin fibers in deep shades of exceptional fastness to light.

A further object is to provide a process for the dyeing of polypropylene containing a Werner complex-forming metal with water insoluble monoazo dyestuffs of the benzothiazole series containing chelatable groups.

These and other objects are accomplished according to our invention wherein normally solid polymers of α-olefins having from 2 to 3 carbons per unit and containing Werner complex forming metals or compounds thereof are contacted with an aqueous dispersion of water-insoluble benzothiazole monoazo dyestuff which contain at least one group capable of forming a metal chelate with said metal and which will hereinafter be described in more detail.

Werner complex forming metals of particular interest in the present instance include nickel, chromium, cobalt, zinc, titanium, aluminum, iron, copper, zirconium, manganese, cadmium, vanadium and the like.

Chelatable azo dyestuffs are well known in the dyestuff art. Such dyestuffs possess a group or groups capable of binding certain metals by means of coordinate and covalent linkages commonly associated with metal chelate compounds.

Polymers of α-olefins, especially polypropylene, are subject to degradation on exposure to heat and light such as is encountered during mechanical processing as for example in molding, extrusion and the like and during exposure of the finished articles such as rugs, draperies, automobile seat covers, to sunlight.

It is known that polymers of α-olefins and especially polypropylene can be stabilized against degradation due to light and heat by incorporating in the polymer various compounds, many of which are compounds, inorganic and organic, of metals, such as chromium nickel, zinc, cobalt, copper, cadmium and the like. These metals belong to the transition group of elements and characteristically are capable of forming Werner type complex compounds. Nickel compounds such as the bis(p-alkylphenol) monosulfide nickel compounds disclosed in U.S. Patent 3,006,885 as stabilizers for polypropylene, are especially effective in this connection. Inorganic chromium compounds, as disclosed in French Patents 1,142,024 and 1,142,025 are likewise effective in minor amounts as stabilizers for these valuable polymers. The use of compounds of various other of the above metals as additives to polypropylene is disclosed in U.S. Patents 2,971,940, 2,980,645 and 2,997,456.

These stabilizing agents are normally used in relatively small amounts, from about 0.001% to 3% by weight, and are generally incorporated in the polymer during the processing stage. Such small amounts are generally sufficient to provide adequate stabilization of the polymer against degradation by heat and light, and consequently, will be those termed herein as "stabilizing amounts."

It is known, further, that polymers of α-olefins are formed by reacting the olefin monomer in the presence of metal catalysts most, if not all, of which are Werner complex forming metals. The preparation of such polymers generally includes a step designed to remove such catalysts, and trace amounts which may remain in the polymer product are ordinarily not sufficient to impart satisfactory dyeing characteristics.

While the invention is generally applicable to solid polypropylenes, it is particularly advantageously applied to crystalline, isotactic polypropylenes having an intrinsic viscosity above 1.0 (in Tetralin at 135° C.) which are capable of use in production of fibers, films and molded articles. Such polypropylenes are commercially available and are well known in the art. As is also well known, these polypropylenes may be produced by polymerization of propylene in the presence of Ziegler-type catalysts and inert liquid. Ziegler-type catalysts used for this purpose may include a titanium halide such as $TiCl_3$ and an organo aluminum compound such as triethyl aluminum or diethyl aluminum chloride.

I have made the surprising discovery that polyolefin polymers having 2 to 3 carbon atoms per unit and containing a Werner complex-forming metal can be dyed in shades which are exceptionally fast to light, wet treatments, i.e., washing, dry cleaning and the like, and crocking, by contacting the said polymer in solid form with an aqueous dispersion of a water-insoluble benzothiazole monoazo dyestuff having the following general formula:

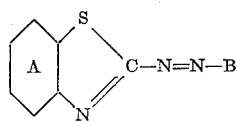

wherein B represents the residue of an aromatic or heterocyclic azo coupling component having a hydroxyl group in ortho position to the azo linkage selected from the group consisting of 1-aryl-5-pyrazolones, 2,4-dihydroxy quinolines, hydroxy-diphenylamines, and β-naphthols and wherein the phenylene nucleus A and the aromatic or heterocyclic residue B may be further substituted by radicals which do not induce water-solubility such as, for example, lower alkyl, lower alkoxy, halogen, nitro, cyano, amino, acylamino (e.g., acetamido), alkylamino (e.g., methyl amino-, di-ethylamino), alkylsulfonyl (e.g., methylsulfonyl), sulfamyl (e.g., N,N-dimethylsulfamyl, N,N-diethylsulfamyl), carbamyl and carbaloxy groups.

Dyestuffs of the foregoing general formula, including metal chelates thereof, are in part disclosed in the prior art. These dyestuffs are conveniently prepared by diazotizing a 2-aminobenzothiazole and coupling the resultant diazonium compound into a suitable coupling component.

As representative of the 2-aminobenzothiazoles which can be used the following can be mentioned:

2-aminobenzothiazole
2-amino-6-methoxybenzothiazole
2-amino-6-ethoxybenzothiazole
2-amino-5-methylbenzothiazole
2-amino-6-methylbenzothiazole
2-amino-6-dodecylbenzothiazole
2-amino-5,6-dimethylbenzothiazole
2-amino-6-sulfamylbenzothiazole
2-amino-6-chlorobenzothiazole
2-amino-4-methoxy-7-bromobenzothiazole
2-amino-6-trifluormethylbenzothiazole
2-amino-5-nitrobenzothiazole
2-amino-6-nitrobenzothiazole
2-amino-6-N,N-diethylsulfamylbenzothiazole
2-amino-6-cyanobenzothiazole
2-amino-6-acetamidobenzothiazole
2-amino-6-n-propionylaminobenzothiazole
2-amino-6-carbomethoxybenzothiazole As illustrative of the aromatic and heterocyclic azo coupling components which can be used for the preparation of the water-insoluble monoazo dyes particularly suited for coloring polyolefins by the process of my invention, the following are cited:

2,4-dihydroxyquinoline
1-phenyl-3-methyl-5-pyrazolone
1-(3-chlorophenyl)-3-methyl-5-pyrazolone
1-(4-nitrophenyl)-3-methyl-5-pyrazolone
3-anilinophenol
3-(2-methylanilino)phenol
3-(N-methylanilino)phenol
2-naphthol
6-(N,N-diethylsulfamyl)-2-naphthol
8-amino-2-naphthol
8-acetamido-2-naphthol
6-cyano-2-naphthol These typical dyestuffs are illustrative of the broad group which are suitable and not all inclusive as will be apparent to those skilled in this art.

The dyeing procedure is carried out in a manner conventional in the dyeing of disperse dyestuffs. These water-insoluble dyes are applied as aqueous dispersions which can be obtained by various known means. For example, the dyestuff is ground in the presence of a dispersing agent by means of a micropulverizer, sand, inorganic salt and the like. The more finely divided the dyestuff composition is, the more effective as a dye the composition will be, as is generally known. The dispersed dye is admixed with a sufficient quantity of water to obtain a thoroughly wetted paste or slurry, which then is diluted with a further quantity of water to obtain the desired concentration of dyestuff in the ultimate dyebath. For dyeing, the polyolefin material is entered into the dyebath, which may or may not contain the usual dyeing adjuvants, e.g., auxiliary wetting agents, etc., and the dyeing effected by heating the bath to a suitable dyeing temperature and working the material in the heated bath for a sufficient period, usually about one hour, to obtain the desired depth of shade. During the latter period, the addition of dilute acid to a pH of below 5, will result in a better exhaustion of the dyestuff from the dyebath. The dyed material may then be rinsed with water, washed with warm (60° C.) mild soap solution, rinsed again with water and dried.

An effective mode of preparing aqueous dispersion of the monoazo dyestuffs suitable for use in this invention, is that described in U.S.P. 3,069,220 to Allied Chemical. By the novel procedure disclosed therein, the metallizable monoazo dyestuff is first dissolved in a water-miscible polyhydric alcohol or ether. To this solution is added, with agitation, a surface active agent and water whereby a neutral aqueous dispersion of the dyestuff in finely divided condition results. The initial dispersion may be advantageously prepared with a relatively limited quantity of water to produce a stable concentrated stock dispersion of the monoazo dyestuff. This dispersion can be used to prepare the dyebath by adding aliquot portions to water as and when desired and the polyolefin dyed according to conventional techniques hereinabove described.

The polyolefins are dyed in accordance with the process of our invention in shades which are characterized by their exceptional fastness to light, to crocking (or rubbing) and to wet treatments, i.e., to washing and to dry cleaning.

The depth of shade obtained in our novel dyeing procedure will depend upon several factors, the most important of which are (1) the amount of metal present in the polymer, and (2) the ease with which the metal and chelatable dyestuff react to form the metal chelate compound.

As will be apparent, the amount of Werner complex forming metal available in the polymer will influence the depth of shade produced. Thus, small amounts of such metal or compound thereof, e.g. 0.002% calculated as metal by weight of polymer, will produce light or pastel shades, whereas "stabilizing amounts" (0.01% or more) will yield deep shades. The metal content of the polymer can be augmented by treating the polymer with a solution or dispersion of metal compound prior to dyeing. The metal can also be added during the spinning or the like operation for the specific purpose of improving the dyeability of the polymer. Amounts of metal in excess of about 3% should not, in general, be added as such amounts may affect the physical properties of the polymer and make it unsatisfactory for the particular use for which it is intended. In general, proportions of metal compounds within the range of concentration of 0.01 to 0.5% of metal are adequate to obtain commercially desirable shades.

The depth of shade obtained is affected also, although to a somewhat lesser extent than by the metal content of the polymer, by the ease with which the dyestuff reacts with the metal to form the chelate compound.

It is well known in the art of metallized dyestuffs that o,o-dihydroxyazo compounds react with metals faster and more completely than o,o'-dialkoxyazo- or o-hydroxy, o'-alkoxyazo- compounds. The various complex forming metals, too, react with chelatable monoazo dyes at different rates also. The varying reaction rate is compounded by the fact that the metal is difficulty accessible being within the hydrophobic polymer and hence these factors will affect the depth of the shade obtained.

While I do not wish to be limited by any theory of the mechanism by which our novel procedure operates, we believe that the monoazo dyestuff forms a coordinate complex or chelate with the metal present within the polyolefin. The result is highly surprising in view of the hydrophobic character of the polymer and the well known resistance of such polymers to penetration by water and organic solvents. My novel process is all the more unobvious in view of our experience that only weak and unsatisfactory dyeings can be obtained by applying premetallized monoazo dyes to propylene by conventional methods, e.g., from aqueous dispersions.

Further I have made the surprising discovery, and this is a particular feature of my invention, that the light fastness of the colorations produced with the particular group of dyestuffs disclosed herein is superior to those produced generally from monoazo dyes containing groups chelatable with a Werner complex forming metal; and in particular to corresponding dyestuffs in which the diazo component is an amino thiazole devoid of an arylene nucleus fused thereon.

The amount of dyestuff employed relative to the amount of polyolefin material to be dyed can be varied over a wide range. The amount used will depend to a major extent upon the depth of shade desired and also upon the metal content of the polymer. In most instances, deep shades can be obtained from 0.5% dyeings, which shades are increased little in intensity by increasing the dye concentration to 2.0% or more. Light shades can be obtained by the use of as little as 0.05% or less of the dyestuff.

The chelatable monoazo dyestuffs used in the process of my invention are substantially insoluble in the aqueous dyebath, which preferably is maintained at a pH of 5 or less. They are applied in the form of aqueous dispersions in the manner of the well known "disperse dye" class. Such dyes, it is known, are in a finely divided condition and usually are assisted by admixture with dispersing agents, which may be of the non-ionic, anionic or cationic groups. The preferred surfactants for the purpose of my invention are of the non-ionic type and especially preferred are those condensation products of ethylene oxide with a hydrophobic material such as a long chain aliphatic, alcohol, acid, ester, ether or alkyl phenol. These products are characterized by containing as the hydrophilic portion of the molecule a plurality of oxyethylene moieties as illustrated by the following general formula R—O—(CH$_2$—CH$_2$O)$_n$—CH$_2$CH$_2$OH wherein R is an alkyl group having from 12 to 22 carbon atoms or an alkyl phenol residue wherein the alkyl group contains from 6 to 13 carbon atoms inclusive, and wherein $n$ is at least 4 and especially between about 6 and 40.

Examples of products in this preferred group of non-ionic dispersants include

"Triton X-100" wherein R is the residue of isooctylphenol and $n$ is 7 to 9.

"Triton X-102" wherein R is the residue of isooctylphenol and $n$ is 11.

"Tergitol NFX" wherein R is the residue of ethylhexylphenol and $n$ is between 8 and 9.

"Neutronic 600" wherein R is the residue of nonylphenol and $n$ is 9.

"Emulphor ELN" wherein R is the residue of dodecylphenol and $n$ is 19.

Dispersants other than the above described group of non-ionics can be used, if desired, to assist dyeing of poly-α-olefins by the finely divided chelatable monoazo dyestuffs. Further, mixtures of such dispersing agents are contemplated in this connection also.

The following examples illustrate the process of my invention. The temperatures are given in degree centigrade and parts and percentages are by weight unless otherwise specified.

EXAMPLE 1

One part of the water insoluble monoazo dyestuff of the formula

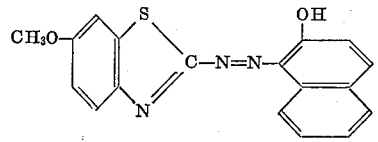

was mulled with 5 parts of diethylene glycol and 0.1 part of Triton X-100 was added. After the addition of about 4000 parts of warm (40°) water, 100 parts of "Herculon Type 40" an isotactic polypropylene containing a bis(p-alkylphenol) monosulfide nickel compound in the amount of about 0.12% calculated as metallic nickel by weight based on the weight of the polypropylene were entered into the dyebath and worked therein as the bath was heated, gradually, to boiling. The dyeing was continued at the boil for one hour. The fiber was removed from the bath, washed well in 0.25% soap solution at 60°, rinsed in warm water and dried. The fiber was colored a deep blue shade, which withstood between 80 and 160 hours exposure in the Fade-ometer. The dyeing also possessed excellent brightness and fastness to washing, dry cleaning and to crocking.

EXAMPLES 2–14

In an analogous manner, isotactic polypropylene ("Herculon Type 40") containing about 0.12% calculated as metallic nickel of a bis(p-alkylphenol) monosulfide nickel compound was dyed with the dyestuffs listed in Table I below on deep bright shades which were characterized by their excellent lightfastness as well as fastness to washing, dry cleaning and crocking. The various polypropylene dyeings were tested for light fastness using AATCC 16A–1960 standard test. The AATCC ratings signify an appreciable break in color fastness after a certain number of hours in a Fade-ometer as follows: 2 (rating)=5 hours; 3=10; 4=20; 5=40; 6=80; 7=160; 8=320.

TABLE I

| Ex. | 2-aminobenzothiazole compound | Coupling Component | Shade | Light Fastness |
|---|---|---|---|---|
| 2 | 2-aminobenzothiazole | β-naphthol | Blue | 6 |
| 3 | 6-ethoxy-2-aminobenzothiazole. | 1-phenyl-3-methyl-5-pyrazolone. | Orange | 6–7 |
| 4 | do | 2,4-dihydroxyquinoline. | Red | 5–6 |
| 5 | do | 3-anilinophenol | Violet | 6–7 |
| 6 | do | β naphthol | Blue | 6–7 |
| 7 | do | 3-(2-methylanilino) phenol. | Violet | 6 |
| 8 | do | 3-methyl-5-pyrazolone. | Orange | 6 |
| 9 | 6-methoxy-2-aminobenzothiazole. | 3-anilinophenol | Violet | 6–7 |
| 10 | do | 3-(2-methylanilino) phenol. | do | 6–7 |
| 11 | do | 3-(N-methylanilino) phenol. | do | 5 |
| 12 | do | 1-phenyl-3-methyl-5-pyrazolone. | Orange | 6–7 |
| 13 | 6-nitro-2-aminobenzothiazole. | β-naphthol | Blue | 6+ |
| 14 | do | 1-phenyl-3-methyl-5-pyrazolone. | Orange | 5 |

It can thus be seen that a novel and efficient method has been devised for the dyeing of poly-α-olefins containing a Werner complex forming metal. As will be evident to those skilled in this art, the invention is not limited to the details of the foregoing purely illustrative examples and that changes can be made without departing from the scope or spirit of my invention.

The presence of the Werner complex form metal or compound thereof in an amount sufficient to impart a degree of stabilization of the poly-α-olefin against degradation by heat and/or light is believed necessary to obtain all the beneficial effects of my invention, and hence such amounts, e.g., 0.01% or more are to be preferred. The amount of such metal used varies widely depending upon the degree of stabilization the fabricator of the polymer desires to impart. Even minor or trace amounts suffice to produce a pronounced improvement in the affinity for dyestuffs containing readily chelatable groups. Conversely, such trace amounts of complex-forming metals produce little or no effect on the affinity for dyes not containing chelatable groups.

I claim:

1. A process for dyeing a normally solid polymer of an alpha olefin having 2 to 3 carbon atoms and containing from 0.002 to 3.0% by weight of a Werner complex forming metal dispersed throughout the polymer which comprises contacting said solid polymer with an aqueous dispersion of a water-insoluble monoazo dyestuff having the formula

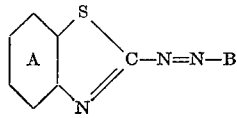

wherein A represents an ortho-arylene radical of the benzene series and B represents the residue of an azo coupling component selected from the group consisting of 1-aryl-5-pyrazolones, 2,4-dihydroxy quinolines, hydroxy-diphenylamines, and β-naphthols, said residue having a hydroxyl group in a position ortho to the azo linkage.

2. The process of claim 1 wherein said dispersion is acidic.

3. The process of claim 1 wherein said metal is present in the amount of 0.01% to 0.05% by weight of the polymer.

4. The process of claim 1 wherein said polymer is isotactic polypropylene.

5. The process of claim 1 wherein the pH of said aqueous dispersion is about 5.

6. The process of calim 1 wherein said metal is nickel.

7. The process of claim 6 wherein said nickel is present in the form of an organic chelate complex.

8. The process of claim 1 wherein said monazo dyestuff is 6-(6-ethoxy-2-aminobenzothiazolylazo)-3-anilinophenol.

9. The process of claim 1 wherein said monoazo dyestuff is 1 - (6 - methoxy - 2-aminobenzothiazolylazo)-2-naphthol.

10. The process of claim 1 wherein said monazo dyestuff is 1 - (6 - ethoxy - 2 - aminobenzothiazolylazo)-2-naphthol.

11. The process of claim 1 wherein said monoazo dyestuff is 4-(6-ethoxy-2-aminobenzothiazolylazo)-1-phenyl-3-methyl-5-pyrazolone.

12. Polypropylene dyed by the process of claim 1.
13. Polypropylene dyed by the process of claim 7.
14. Polypropylene dyed by the process of claim 8.
15. Polypropylene dyed by the process of claim 9.
16. Polypropylene dyed by the process of claim 10.
17. Polypropylene dyed by the process of claim 11.

References Cited
UNITED STATES PATENTS

| | | | |
|---|---|---|---|
| 2,832,764 | 4/1958 | Huenlg | 260—165 |
| 2,857,371 | 10/1958 | Straley et al. | 264—78 |
| 3,240,552 | 3/1966 | Joyner et al. | 8—55 |

NORMAN G. TORCHIN, Primary Examiner

J. E. CALLAGHAN, Assistant Examiner

U.S. Cl. X.R.

8—55